Oct. 27, 1964  F. SCHAUB ETAL  3,154,007
LOCKING MECHANISM FOR FILTER SCREW PRESS
Filed March 14, 1961  2 Sheets-Sheet 1

INVENTORS:
FRANZ SCHAUB & BERNARD SCHLEPER
By Burgess, Dinklage & Sprung
ATTORNEYS INVENTORS:
FRANZ SCHAUB & BERNARD SCHLEPER
By Burgess, Dinklage & Sprung
ATTORNEYS

United States Patent Office 3,154,007
Patented Oct. 27, 1964

3,154,007
LOCKING MECHANISM FOR FILTER SCREW PRESS
Franz Schaub and Bernard Schleper, Oberhausen-Holten, Germany, assignors to Ruhrchemie Aktiengesellschaft, Oberhausen-Holten, Germany, a German corporation
Filed Mar. 14, 1961, Ser. No. 95,534
Claims priority, application Germany Mar. 18, 1960
8 Claims. (Cl. 100—147)

The present invention relates to a locking mechanism for a filter screw press, and more particularly to such a mechanism which includes an annular sealing member constructed and arranged for resilient pressing disposition across the annular discharge opening of the filter screw press.

Belgian Patent No. 581,174 discloses filter screw press constructions which are especially suited for filtering suspensions having liquid contents above 50%, such as polyethylene suspensions. Due to the particular construction involved, the filter screw press apparatus may be used not only for the theretofore commercially utilizable suspensions having lower liquid contents but also for suspensions having above 50% liquid contents. Of course, it will be appreciated that the effect of such filter screw presses for the most part depends upon the particular structure of the locking mechanism for the casing space at the discharge end of the press.

It is an object of the present invention to provide a locking mechanism for a filter screw press having an annular sealing member constructed and arranged for resilient pressing disposition across the annular discharge opening of a filter screw press, whereby suspensions having liquid contents of about 50%, such as polyethylene suspensions, may be efficiently treated to separate the liquid fraction from the solid fraction, by means of such improved locking mechanism construction.

Other and further objects of the invention will become apparent from a study of the within specification and accompanying drawings, in which.

Figure 1:
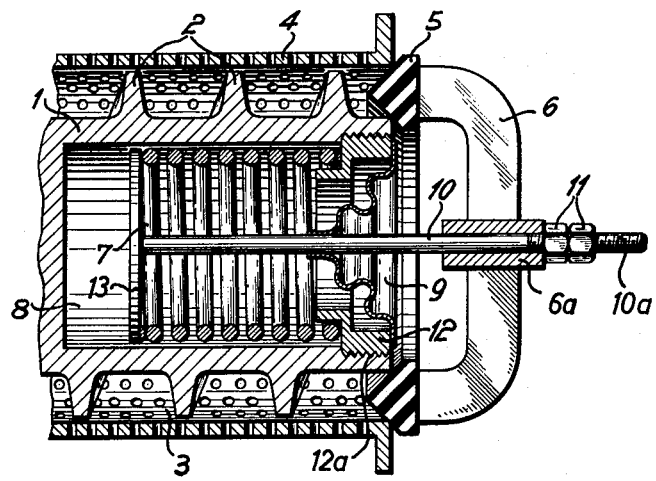
FIGURE 1 is a partial sectional view of a discharge end assembly of a filter screw press in accordance with one embodiment of the invention.

It has been found in accordance with the present invention that a locking mechanism for a filter screw press having an outer filter casing and a conveyor screw rotatably positioned therewithin may be provided which comprises an annular sealing member constructed and arranged for resilient pressing disposition across the annular discharge opening of the filter screw press. The annular discharge opening is provided with a radially outer edge defined by the corresponding end of the casing thereat, and a radially inner edge defined by the corresponding end of the conveyor screw shaft thereat. The radially outer portion of the annular sealing member is disposed in resilient pressing engagement with the annular discharge opening outer edge, and the radially inner portion of said annular sealing member is disposed in resilient pressing engagement with the annular discharge opening inner edge.

Suitably, the locking mechanism is maintained in resilient pressing disposition by prestressed spring means, such as coil spring means. The spring means may be adjusted in tension by suitable means, such as a screw mechanism, positioned for axial displacement along the axis of the filter screw press and locking mechanism so that the desired amount of pressure may be applied to the annular discharge opening to prevent the seepage of liquid therethrough while permitting the discharge of filtered solids.

The annular sealing member is preferably provided with a convex sealing surface of V-shaped cross-section or of arcuate, i.e., semi-circular, cross-section so as to enable an effective sealing to be attained between the inner and outer portions of the annular sealing member and the corresponding inner and outer edges of the annular discharge opening.

The faying or closely uniting surface of the annular sealing member or the entire sealing member itself may be made of metal or resilient material, such as rubber, polyethylene, or other polymer or plastic composition having similar properties. This permits the annular sealing member to maintain tight sealing engagement with the annular discharge opening. Since the annular discharge opening is positioned immediately at the discharge end of the conveyor screw, a uniform flow of material will be assured, without excessive accumulation of material which might otherwise form a plug of filter cake material between the conveying path of the filter screw and the discharge opening. Were the cross-section immediately adjacent to the discharge opening increased over that flow cross-section through the remaining conveyor screw path, undesired excessive accumulation of material before the discharge opening might occur. However, it is preferred that the discharge end of the casing and the discharge end of the conveyor screw both terminate at the same axial point of the apparatus whereby the annular discharge opening will be located in a plane which passes transversely through the axis of the press at such terminal point. Consequently, the filter cake is discharged from the filter screw press in a loose state and at a uniform rate through both annular discharge spaces, i.e., the intermediate space between the radially outer portion of the annular sealing member and the outer edge of the annular discharge opening on the one hand, and between the radially inner portion of the annular sealing member and the inner edge of the annular discharge opening on the other hand. Of course, the annular discharge opening outer edge is defined by the casing wall while the annular discharge opening inner edge is defined by the conveyor screw shaft.

The foregoing construction is essential for satisfactory operation of filter screw presses of the instant type since otherwise the formation of plugs of filter cake material will settle in the apparatus before the discharge opening, causing the clogging of the discharge opening area and the build-up of excessively high pressures which may eventually lead to the rupture of the filter casing.

Thus, a device for filtering highly fluid suspensions containing solids is provided in accordance with the invention, such device having means defining a spiral conveying path, a filter surface means outwardly confining the spiral path means and being spaced therefrom a slight distance sufficient to allow conveying movement of the spiral path means, inlet means for a highly fluid suspension at one end portion of the path defined by the spiral path means and annular discharge outlet means for separated solids at the other end portion of the path. Accordingly, the radially outer edge of the annular outlet means is defined by the filter surface means and the radially inner edge of the annular outlet means is defined by the spiral path means. Effectively, a yieldable annular pressure valve means is urged against the annular discharge outlet means to normally close the same, whereby the spiral path means is capable of forcing a highly fluid suspension along the path defined by the filter surface means and against the filter surface means during travel of the suspension along the path so as to filter the fluid content of the suspension and force the solids content remaining against the valve means to open the outlet means and discharge the separated solids.

Specifically, the means confining the spiral conveying path includes a rotatably mounted conveyor screw having a freely suspended discharge end. The conveyor screw may take the form of a center shaft having a helical conveying flange disposed therealong. On the other hand, the filter surface means may be formed as a cylindrical perforated casing suitable for separating the liquids content from the solids content of the highly fluid suspension being treated.

In accordance with one particular embodiment of the invention, the discharge end of the conveyor shaft is provided with a coaxial recess while the annular sealing surface of the valve means is provided with a coaxial valve shaft connected thereto. The compression spring means includes a prestressed coil spring operably positioned within the coaxial recess for inwardly urging the coaxial valve shaft and, in turn, the annular sealing surface into engagement with the inner edge of the casing and the outer edge of the conveyor shaft. Radial arm means may be provided for connecting the annular sealing surface with the coaxial valve shaft, the arm means being centrally joined to form a coaxial bearing for said valve shaft.

Suitably, one end of the valve shaft extends outwardly through the bearing and is provided with axially adjusted stop means thereon which serves to abut the bearing whereby axial position adjustment of the valve shaft end with respect to the bearing may be achieved. Since the other end of the valve shaft extends inwardly into the coaxial recess of the conveyor shaft, passing through the coil spring thereat, and is provided with a retaining disc thereon for engaging the inward end of the coil spring, the axial position adjustment of the outward valve shaft end will in turn cause the adjustment of the tension of the coil spring. Notably, the outward end of the coil spring is fixedly seated in the outward portion of the conveyor shaft recess so that such spring will be influenced only by the pressure exerted thereupon by the retaining disc of the valve shaft in dependence upon the axial position of such valve shaft. In order to prevent seepage of the filtered solids material into the conveyor shaft recess, a bellows covering means is disposed across this recess which is peripherally sealed to the conveyor shaft end portion and centrally connected to the coaxial valve shaft. As a result, the central portion of the bellows covering means will move with the coaxial valve shaft in response to axial displacement of such valve shaft and, in turn, the annular surface means when the valve means is yieldably opened against the tension of the coil spring by the force of filtered material discharging from the device.

In accordance with a further embodiment of the invention, the annular sealing surface is provided with a coaxial valve shaft connected thereto at one end by means of radial arms centrally joining said shaft, the other end of said coaxial valve shaft being displaceably mounted in a bearing of a support means external to the annular discharge outlet means. The compression spring includes a prestressed coil spring operably positioned on the support means for inwardly urging the coaxial valve shaft and, in turn, the annular sealing surface into engagement with the inner edge of the casing and the outer edge of the conveyor shaft. The outer end of the coaxial valve shaft carries a retaining disc thereon for engaging the inward end of the coil spring, whereas the outer end of said coil spring is seated against a stop means or adjustable cap. The adjustable cap is axially adjustbly positioned upon coaxial support flange secured to the support means. Consequently, by adjusting the axial position of the stop means, the tension of the coil spring may be adjusted in turn. Naturally, the coaxial valve shaft is connected for axial movement within the bearing in response to axial displacement of the annular surface means when the valve is yieldably opened against the tension of the coil spring by the force of the filtered material discharging from the device.

Referring to the drawing, FIGURE 1 represents a longitudinal section of the discharge end of the filter screw device containing a shaft 1 having a helical flange or thread 2 disposed therealong to form a filter path 3 between the screw shaft 1 and the filter casing or sieve 4. Naturally, a sufficient spacing between the radially outer end of thread 2 and the confining edge of the sieve 4 is provided to enable the filter screw to rotate in the desired manner for conveying solids along the filter path 3. The discharge ends of the sieve 4 and the shaft 1 both terminate at the same axial point of the device. The other portions of the filter screw press are not shown as the same are conventional.

Suitably, an annular sealing member 5 is maintained in yieldable pressure engagement with the annular discharge opening defined between the discharge edges of the sieve 4 and the shaft 1.

Figure 2:
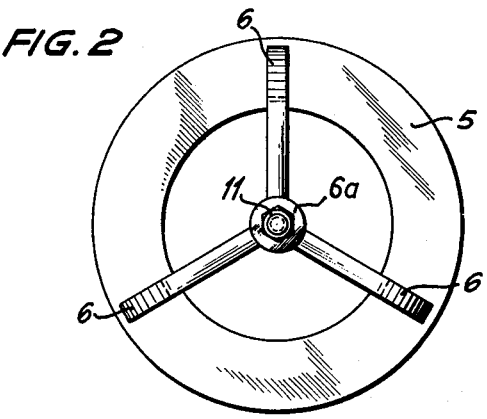
FIGURE 2 is an end view of the locking mechanism shown in FIGURE 1.

As may be seen more clearly from FIGURE 2, the annular sealing member 5 is provided with three radial arms 6 joined centrally to form a bearing 6a.

Referring once more to FIGURE 1, a coil spring 7 which is used to exert the back pressure or resilient pressure engagement is inserted coaxially within a recess 8 at the discharge end of the screw shaft 1. At the discharge end of the screw shaft 1, a flange ring 12 is seated by means of a thread connection 12a against the corresponding portion of recess 8. A coaxial valve shaft 10 is seated at one end for displacement in bearing 6a, the other end of coaxial valve shaft 10 carrying the retaining disc 13. The outer end of spring 7 is fixedly disposed against flanged ring 12 while the inner end of coil spring 7 is maintained in abutting engagement with retaining disc 13. The exterior end of coaxial valve shaft 10 is threaded at 10a and a pair of nut members 11 are disposed on shaft 10 adjacent to the outer end of bearing 6a. Accordingly, by axial displacement of nut members 11 along the threaded portion 10a of valve shaft 10, the shaft 10 will be displaced within bearing 6a, in turn casing the displacement of retaining disc 13 so as to adjust the tension of the prestressed coil spring 7 within recess 8. In order to prevent seepage into recess 8 of material discharged from the device, a bellows member 9 is disposed across the discharge end of shaft 1 at the recess 8. The bellows member 9 is centrally joined to coaxial valve shaft 10 so that the same may be axially displaced when shaft 10 is displaced either by way of adjustment due to the movement of nut members 11 or by way of the axially outward movement of annular sealing member 5 due to the force of material being discharged from the device.

It will be appreciated that since the peripheral edge of bellows member 9 is secured to the corresponding edge of flange ring 12 at the discharge end of shaft 1 and the central portion thereof is joined to coaxial valve shaft 10, the entire locking mechanism including the annular sealing member assembly 5, coaxial valve shaft 10, spring 7, flange ring 12 and bellows member 9 may be removed from the discharge end of the device by merely unscrewing the flange ring 12 from attachment with the corresponding portion of the recess 8 at the end of shaft 1.

In the particular embodiment shown in FIGURES 1 and 2, the annular sealing member 5 is provided with a convex sealing surface of V-shaped cross-section. This permits the outer portion of the V-shaped surface to engage discharge end of sieve 4 and the inner portion of the V-shaped surface to engage the discharge end of shaft 1. Of course, the annular sealing member 5 may be provided with any other suitable convex surface to achieve the desired sealing engagement, such engagement suitably occurring at one axial point in a plane transverse the discharge ends of the sieve 4 and shaft 1.

It will be appreciated that the position of the annular member 5 permits the same to be rotated together with the screw shaft 1, and during this time by reason of bellows member 9 prevents any liquid or solid constituents of material being treated from contacting the coil spring and disturbing the optimum performance of the apparatus. If the annular member 5 is rotated together with the screw shaft, the filter cake is discharged in a thinner layer, so that the said two annular discharge openings are smaller and as result thereof, a substantially safe sealing of the locking device is obtained. Understandably, it is also possible to mount the locking mechanism, including the annular member 5, such that the same is stationarily connected with the casing or sieve 4 of the filter screw press, depending upon the intended action to be exerted upon the filter cake.

Figure 3:
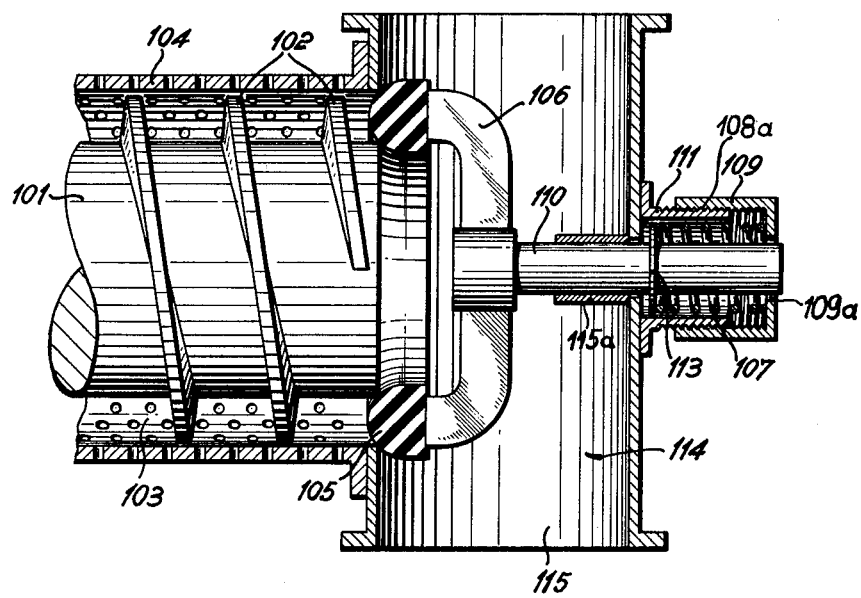
FIGURE 3 is a partial sectional view of a filter screw press in accordance with an alternate embodiment of the invention.
Figure 4:
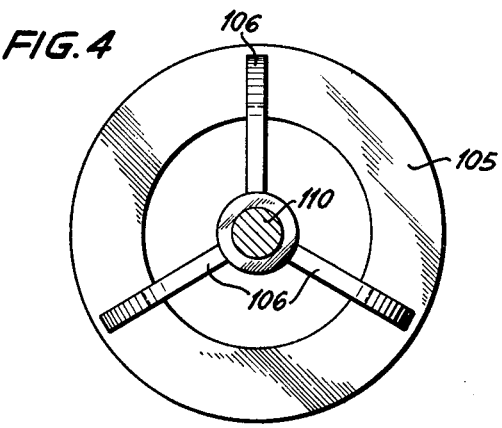
FIGURE 4 is an end view of the locking mechanism shown in FIGURE 3.

Referring to FIGURES 3 and 4, the screw shaft 101 is provided with the thread 102 defining a helical conveying path 103 between shaft 101 and filter casing or sieve 104. A suitable clearance between the radially outer edge of thread 102 and sieve 104 is provided in order to enable the screw shaft to be rotated within the confining sieve 104. In this instance the discharge end of the shaft 101 is freely mounted for rotation and this end terminates at the same axial point at which the sieve 104 terminates. The remainder of the filter device is not shown in the drawing as this is conventional.

The annular sealing member 105 is disposed against the discharge end defined by the casing or sieve 104 and the shaft 101 thereat. Said annular member 105 is connected by radial arms 106 (see FIGURE 4) and centrally joined to the inner end of coaxial valve shaft 110, said valve shaft extending through a bearing 115a disposed on a portion of discharge outlet supporting wall 114. On the opposite side of wall 114, a cylindrical support flange 111 is provided, said support flange 111 having a cap 109 disposed for axial displacement therealong by means of thread connection 108a. A coil spring 107 is provided in prestressed condition about the outer end of shaft 110 between the cap 109 and the retaining disc 113 disposed inwardly of spring 107 on shaft 110. By rotating cap 109 along the thread connection 108a of support flange 111, the tension of spring 107 may be adjusted. For this purpose, cap 109 is provided with an aperture 109a through which the outer end of shaft 110 may be passed. More significantly, as the material being discharged passes through the discharge opening to the outlet 115, the annular member 105 will be axially displaced, causing retaining disc 113 to compress spring 107 against cap 109. This action will cause the movement of shaft 110 outwardly through the aperture 109a of the cap 109.

The annular member 105 in this instance is shown with a convex annular sealing surface having a hemispherical cross-section. Naturally, however, the convex sealing surface may take any other suitable form such as that of the annular member 5 of FIGURE 1.

It will be appreciated that in each of the figures, filter cake material having a high solids content will force the axial outward displacement of the annular sealing member whereby the solids material will pass out between the casing or sieve and the radially outer surface of the annular member, and will also pass out between the shaft and the radially inner surface of the annular member.

The following example is set forth for the purpose of illustrating the invention and it is to be understood that the invention is not to be limited thereby.

*Example*

To a filter screw press of the type described having a cylindrical sieve casing with an inside diameter of 106 mm. and a conveyor screw with an outside thread diameter of 100 mm., a lead of ~⅔ of the outside thread diameter and an inner shaft diameter of 80 mm., were fed 3,000 liters per hour, corresponding to about 2,330 kg. per hour of a suspension of polyethylene in heavy benzine with a solids content of about 10% by weight. The annular space between the inner shaft (80 mm. diameter) and the outer sieve casing (106 mm. diameter) at the discharge end of the device was sealed by an annular sealing member having a convex sealing surface of V-shape cross-section. The outside diameter of the annular sealing surface was 112 mm. and the inside diameter thereof was 75 mm., it was pressed against the outlet opening with a pressure of 3 kg./cm.$^2$ in relation to the cross-section of the opening of the filter device.

The plastic material fed to the screw press was forced against the annular sealing member with a conveyor screw rotation of 25 r.p.m. whereby the liquid was squeezed out through the sieve which contained openings of 0.19 mm. diameter. The liquid obtained in this manner represented a substantially clear filtrate.

On the other hand, the solids content was extruded through both the annular orifices, i.e., between the sieve casing and the radially outer surface of the annular member and between the corresponding edge of the shaft and the radially inner surface of the annular member.

In the foregoing manner, a filter cake of about 380 kg. per hour was obtained exhibiting a liquids content of about 70 to 90% based upon the solids in dry form, i.e., 70 to 90 parts by weight of liquid were present per 100 parts by weight of dry solids.

It will be appreciated that an annular sealing member or locking mechanism in accordance with the invention, may be used for filter screw presses of any size, although it is preferred that the dimensions be chosen in a suitable ratio such as that indicated in the foregoing example.

What is claimed is:

1. Device for filtering highly fluid suspensions containing solids, which comprises means defining a spiral conveying path including a filter surface in the form of a cylindrical perforated casing and a central rotatable conveyor screw in the form of a shaft having a helical conveying flange disposed therealong, said casing outwardly confining said screw and being spaced from said flange a slight distance sufficient to allow conveying movement of said screw, inlet means for a highly fluid suspension at one end portion of the path defined by said spiral conveying path means, said screw and casing having discharge ends, respectively, which terminate at the same axial point at the other end portion of said path to form annular discharge outlet means, the radially inner edge of the casing discharge end defining thereat a radially outer line contact edge of said annular discharge outlet means and the radially outer edge of said conveyor shaft, radially inward of the outer edge of said helical flange, defining thereat a radially inner line contact edge of said annular discharge outlet means, an adjustable compression spring, and a yieldable annular pressure valve means having an annular convex sealing surface, said surface being urged by said adjustable compression spring against said outlet means to normally close said outlet means and resiliently sealingly engage the radially inner edge of said casing in line contact with the radially outer convex portion of said annular sealing surface and the radially outer edge of said shaft in line contact with the radially inner convex portion of said annular sealing surface, said screw being capable of forcing a highly fluid suspension along said path confined by said casing and against said casing during travel of the suspension along said path to filter the fluid content of said suspension through said casing and to force the solids content remaining against said valve means to open said outlet means and discharge the separated solids.

2. Device according to claim 1 wherein said annular sealing surface is a convex surface of V-shaped cross-section.

3. Device according to claim 1 wherein said annular sealing surface is a convex surface of arcuate cross-section.

4. Device according to claim 1 wherein the discharge end of said conveyor shaft is provided with a coaxial recess, said annular sealing surface is provided with a coaxial valve shaft connected thereto, said compression spring means including a prestressed coil spring operably positioned within said coaxial recess for inwardly urging said coaxial valve shaft and in turn said annular sealing surface into engagement with said inner edge of said casing and said outer edge of said conveyor shaft.

5. Device according to claim 4 wherein said annular sealing surface is connected to said coaxial valve shaft by radial arm means, said arm means being centrally joined to form a coaxial bearing, one end of said valve shaft extending outwardly through said bearing and being provided with axially adjustable stop means thereon for abutment with said bearing for axially adjustably positioning said valve shaft end with respect to said bearing and thus for adjusting the tension of said coil spring, the other end of said valve shaft extending inwardly into said coaxial recess of the conveyor shaft and through said coil spring and being provided with a retaining disc thereon for engaging the inward end of said coil spring, the outward end of said coil spring being seated in the outward portion of said recess, and a bellows covering means disposed across said recess and being centrally connected to said coaxial valve shaft for movement therewith in response to axial displacement of said valve shaft and, in turn, said annular surface means when said valve is yieldably opened against the tension of said coil spring by the force of filtered material discharging from the device.

6. Device according to claim 1 wherein said annular sealing surface is provided with a coaxial valve shaft connected thereto, said shaft being mounted in support means external to said annular discharge outlet means, said compression spring including a prestressed coil spring operably positioned on said support means for inwardly urging said coaxial valve shaft and, in turn, said annular sealing surface into engagement with said inner edge of said casing and said outer edge of said conveyor shaft.

7. Device according to claim 6 wherein said annular sealing surface is centrally connected to one end of said coaxial valve shaft by radial arm means, the other end of said coaxial valve shaft being dispaceably mounted in a bearing of said support means and carrying a retaining disc thereon for engaging the inward end of said coil spring, said support means having a coaxial support flange and an axially adjustable stop means positioned thereon, the outward end of said coil spring being seated within said support flange and in abutting engagement with said stop means, said stop means adjusting the tension of said coil spring by axial adjustment of said stop means on said support flange, said coaxial valve shaft being connected for axial movement within said bearing in response to axial displacement of said annular surface means when said valve is yieldably opened against the tension of said coil spring by the force of filtered material discharging from the device.

8. In a device for filtering highly fluid suspensions containing solids, including means defining a spiral conveying path having a filter surface means which is provided with a cylindrical perforated casing outwardly confining a central rotatable conveyor screw which screw is provided with a shaft having a helical conveying flange disposed therealong, said casing being spaced from said flange a slight distance sufficient to allow conveying movement of said screw, inlet means for a highly fluid suspension at one end portion of the path defined by said spiral path means and discharge outlet means for separated solids at the other end portion of said path, the improvement which comprises providing the discharge outlet means as annular discharge outlet means, the radially outer edge of said annular outlet means being defined by said perforated casing and the radially inner edge of said annular outlet means being defined by said rotatable conveyor screw, said conveyor screw and said perforated casing having discharge ends, respectively, which terminate at the same axial point, the inner edge of said casing defining thereat a radially outer line contact edge of said annular discharge outlet means and the outer edge of said conveyor shaft, radially inward of the outer edge of said helical flange, defining thereat a radially inner line contact edge of said annular discharge outlet means, an adjustable compression spring, and a yieldable annular pressure valve means having an annular convex sealing surface, said surface being urged by said adjustable compression spring against said annular discharge outlet means to normally close and resiliently sealingly engage said discharge outlet means with the radially outer convex portion of said annular sealing surface engaging in line contact the inner edge of said casing and the radially inner convex portion of said annular sealing surface engaging in line contact the outer edge of said conveyor shaft, said conveyor screw being capable of forcing a highly fluid suspension along said path confined by said casing and against said casing during travel of the suspension along said path to filter the fluid content of said suspension and to force the solids content remaining against said valve means to open said outlet means and discharge the separated solids.

References Cited in the file of this patent

UNITED STATES PATENTS

| | | |
|---|---|---|
| 556,023 | Pew | Mar. 10, 1896 |
| 1,349,881 | Herrick | Aug. 17, 1920 |
| 1,772,262 | Naugle | Aug. 5, 1930 |
| 2,903,960 | Zies | Sept. 15, 1959 |
| 2,946,444 | Zievers et al. | July 26, 1960 |
| 3,064,557 | Ginaven | Nov. 20, 1962 |

FOREIGN PATENTS

| | | |
|---|---|---|
| 132,753 | Germany | Aug. 5, 1902 |
| 439,734 | Germany | Sept. 21, 1927 |
| 707,639 | Great Britain | Apr. 21, 1954 |
| 1,030,375 | France | Mar. 11, 1953 |